March 16, 1937. C. A. RITCHIE 2,073,879
AGRICULTURAL IMPLEMENT
Filed Dec. 24, 1935 2 Sheets-Sheet 1
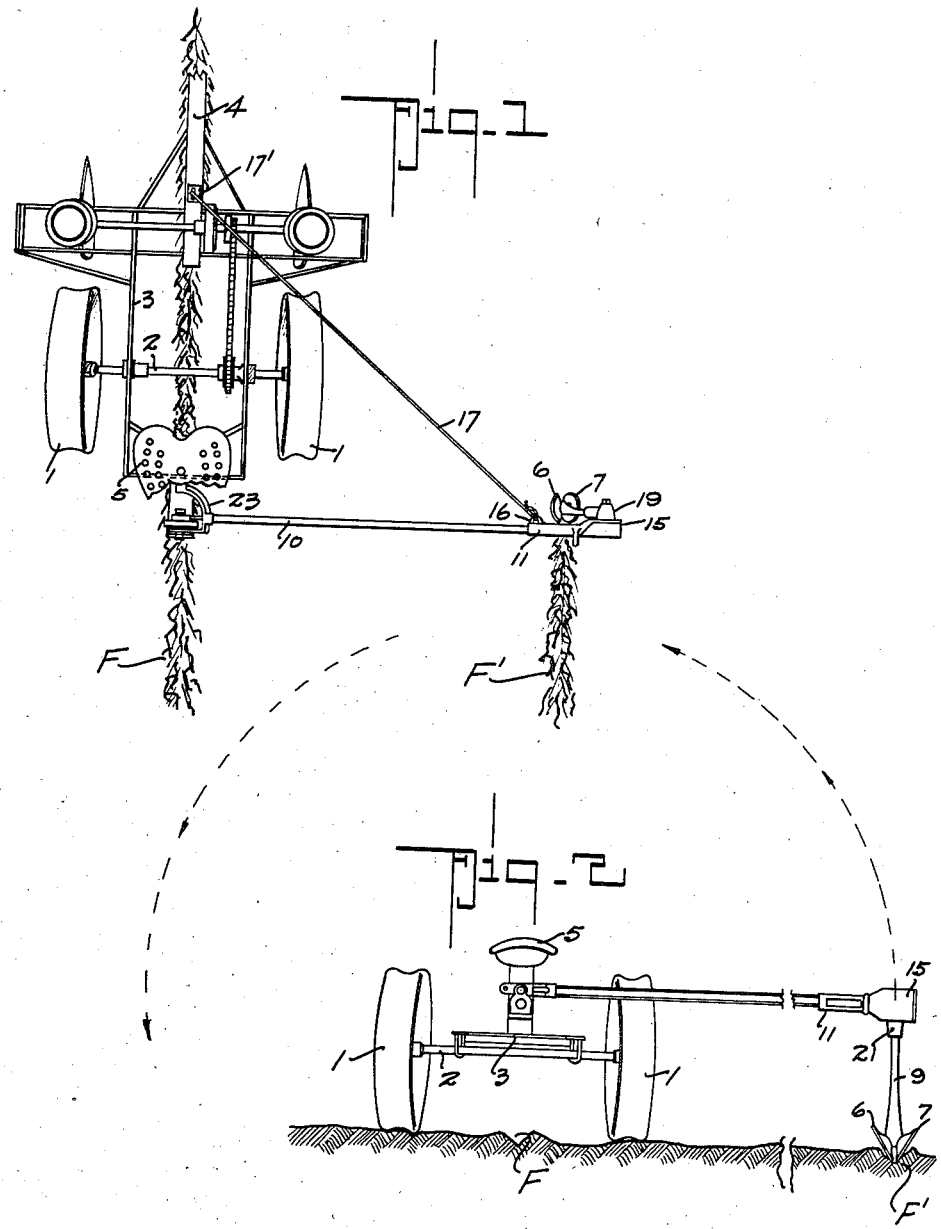
Conrad A. Ritchie
Inventor
By Herbert E. Smith
Attorney

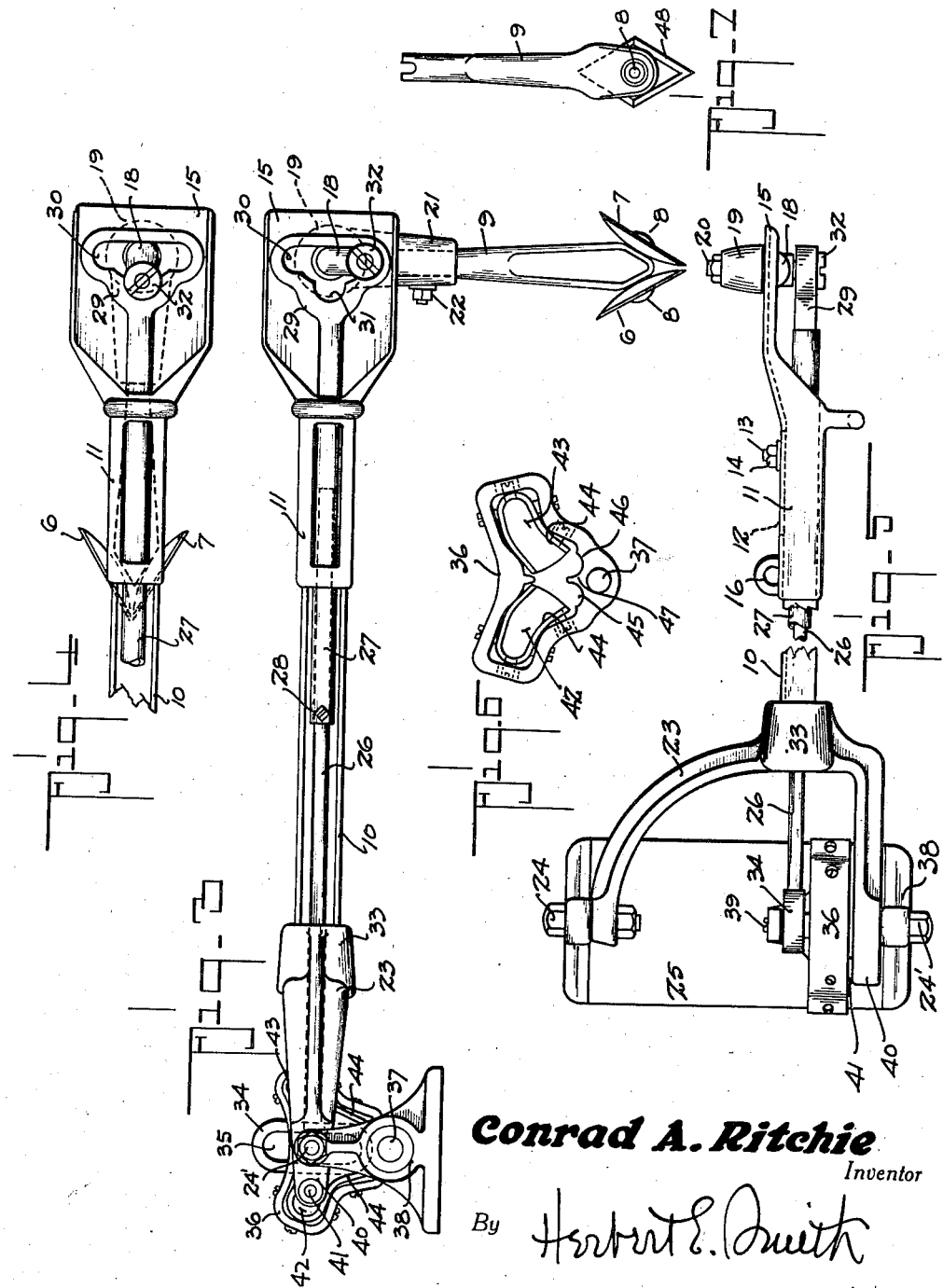

Patented Mar. 16, 1937

2,073,879

UNITED STATES PATENT OFFICE 2,073,879

AGRICULTURAL IMPLEMENT

Conrad A. Ritchie, Spokane, Wash.

Application December 24, 1935, Serial No. 56,070

4 Claims. (Cl. 97—230)

The present invention relates to improvements in agricultural implements and especially to such implements as are adapted for marking rows, or furrows, in a field, for subsequent planting of seed, for the purpose of insuring the growing of a crop in properly spaced rows.

As an example of the utility of the device of my invention I have illustrated the marking device in combination with and mounted upon a conventional double row corn planter, or potato planter. The device is thus employed as an attachment, mounted at the rear of the implement, and adapted to be swung in a vertical plane through an arc of approximately one hundred and eighty degrees, for use in marking lines or forming furrows at either side of the implement. After the first line is marked, or the first furrow is opened, the device is swung laterally to the opposite side of the implement, the implement is turned around at the end of the row and then started in the opposite direction. The first row is utilized as a guide as the implement passes over the field with its longitudinal axis alined with the furrow, and the laterally projecting marker forms the second furrow or row in parallelism with the first one. At the end of each completed row or furrow, the implement is turned around, and the marker is swung laterally to the opposite side thereof for opening a succeeding furrow.

In carrying out my invention I provide a marker, or furrow-opener which may be adjusted both laterally and vertically to suit varying conditions, and means are provided whereby the marker or furrow opener is at all times in position perpendicular to the surface of the field to insure uniform and regularly alined furrows or planting lines.

The invention consists in certain novel combinations and arrangements of parts as will hereinafter be more fully described and claimed. In the accompanying drawings I have illustrated one complete example of the physical embodiment of my invention in which the parts are combined and arranged according to one mode I have thus far devised for the practical application of the principles of my invention. It will be understood that changes and alterations may be made in combining the device of my invention with various implements, and changes and alterations may also be made in the construction of the device, within the scope of my claims, without departing from the principles of the invention.

Figure 1 is a top plan view illustrating the use of the device of my invention as an attachment for a planter, one furrow being indicated and used as a guide, and a second, parallel furrow being in the course of formation.

Figure 2 is a rear elevation of the implement in Figure 1 showing by dotted lines the manner of swinging the device through a vertical plane of approximately one hundred and eighty degrees.

Figure 3 is an enlarged detail rear elevation of the device, detached from the implement, with the furrow opener in perpendicular position, and Figure 4 is a similar view of part of the device showing the furrow-opener alined with its carrier or suspending arm.

Figure 5 is a detail plan view of the detached device, partly broken away for convenience of illustration.

Figure 6 is a detail view in elevation showing the rear face of the eccentric link, or cam plate, which operates the rod and crank for imparting the auxiliary swing to the marker during the swinging movement of the device.

Figure 7 is a detail view showing a modified form of the marking tool.

For convenience of illustration and description I shall refer to the marker as a furrow-opener, for opening the furrows F and F' in Figures 1 and 2, in which the seeds are afterward planted for growing a crop. In these figures of the drawings I have shown the device of my invention mounted upon a double row seed planter having the usual spaced wheels 1 and axle 2, frame 3, draft tongue 4, and the driver's seat 5. The previously formed furrow F is employed as a guide line for the implement, and the marker or furrow-opener is operating at the right side of the implement to open the furrow F', the furrow-opener being shown in Figure 1 as automatically adjusted to the ground surface. In Figure 2 the supporting arm or carrier is in horizontal position, parallel with the surface of the field, and the furrow opener is perpendicular to the arm and the level field.

The furrow opener is of the double disk type comprising concavo-convex disks 6 and 7 journaled at 8 on the lower end of the holder 9, which is pivotally suspended from the outer free end of a carrier arm 10. This arm has mounted on its end a tubular extension 11 which is slotted at 12 to accommodate a clamp bolt 13 protruding from the arm 10 through slot 12, and the nut 14 on the bolt is used to clamp the sleeve or tubular extension 11 on the end of the arm 10. In this manner the length of the suspending arm or carrier may be varied for the purpose of varying the distance between the parallel furrows F and F'.

The tubular extension 11 of the arm 10 is fashioned with a flat head 15, slightly offset from the extension, as seen in Figure 5, and the flat head of somewhat rectangular shape is disposed in a vertical plane and designed to support or suspend the pivoted furrow opener.

A ring or clevis 16 is mounted on the arm near its outer end, and a cord or cable 17 is attached thereto for use as a brace or draft-cable. The cable extends forwardly and inwardly to the implement, and at 17' is attached to a suitable part, as the draft tongue 4 for instance. The cable thus forms a diagonally extending brace for resisting strains imposed against the furrow opener at the free end of the arm or carrier.

At its upper end the holder of the furrow opener is supported on a crank 18 that is journaled transversely in a bearing of the flat head 15, and the holder is provided with a head 19 that is fixed on the crank by means of the bolt 20. The head 20 has an integral sleeve or tubular socket 21 into which the upper end of the holder 9 is inserted, and a set bolt 22 is employed to hold the holder 9 in its socket. In this manner the furrow opener may be adjusted for depth of the furrow; the furrow-opening tools may be changed if desired; and the tool may readily be detached and replaced for repairs or for other purposes.

At its inner hinged or pivoted end the carrier-arm 10 terminates in a bearing yoke 23 having alined pivots 24 and 24' that are axially alined with the longitudinal axis of the implement. These pivots or bearings are supported or mounted in a base plate 25 that is rigidly bolted to the frame 3 of the implement, preferably at the rear of the seat 5, and as before stated, the pivots or hinges are alined with the longitudinal axis of the implement.

From this description it will be apparent that the carrier arm, and the furrow opener suspended from its free end, may be swung in a vertical plane, through an arc of approximately one hundred and eighty degrees, from one side to the other side of the implement, as required for use. During this swinging movement, the furrow opener partakes of an additional or auxiliary movement, with relation to the carrier arm, so that at the end of the swing of the carrier, the furrow-opener will be in proper position with relation to the ground surface, for opening the next furrow, as previously described.

To accomplish the auxiliary movement of the furrow opener I utilize an eccentric rod 26, which is mounted in the carrier arm, and this rod includes a tubular extension or sleeve 27 that telescopes over the outer free end of the rod 26. A clamp bolt 28 is threaded through the sleeve to engage the rod, and by this means the length of the eccentric rod may be varied or adjusted to compensate for similar changes in the carrier arm, and also for adjusting the range of movement of the furrow opener as it swings on the crank 18 as a center.

The tubular portion 27 of the eccentric rod terminates in a head 29 fashioned with a vertically extending slot 30 and a lateral center notch or seat 31, and this slotted head is loosely mounted on the crank 18 and retained thereon against displacement, by a retaining screw 32.

The eccentric rod passes through and is reciprocable in a boss 33 of the yoke 23, and at its inner end the rod is provided with a head 34 fashioned with a transversely extending slot 35. The rod is loosely connected with an eccentric head or oscillatable cam-plate 36, which has a pivot pin 37 projecting from its rear face, and this pin is journaled to turn in a bearing 38 of the base plate, located just below the journal 24' of the yoke 23 of the carrier arm, and both bearings or journals 24' and 37 are alined with the longitudinal axis of the implement.

On the front face of the eccentric head, as distinguished from the rear face and pin 37, another pin 39 is fixed and projects forwardly from the front face and through the slot 35 of the slotted head 34 of the eccentric rod, and this pin 39, when the furrow opener is in operative position is axially alined with the two carrier journals 24 and 24'. Pin 39 oscillates with the eccentric head, to longitudinally move the eccentric rod, when the head oscillates on its pivot 37, thereby swinging the furrow opener.

The eccentric head is oscillated by and with the swinging movement of the carrier arm as the latter swings on its pivots 24 and 24'. For this purpose, one arm of the yoke 23 is extended at 40 beyond the pivot 24', and this extension 40 is provided with an actuating pin 41 that projects forwardly of the implement into and for coaction with the two angularly disposed slots or grooves 42 and 43 of the eccentric head. These slots or grooves are of ample size to accommodate a pair of substantially U-shaped spring blades 44, disposed in opposed relation, as liners, for guiding the movements of the actuating pin 41, or rather for guiding the movement of the eccentric head as the latter is oscillated by the movement of the pin 41.

The lower portions of the slots or grooves 42 and 43 of the eccentric head terminate in retainnig seats or notches 45 and 46 in close proximity to the pin 37 on which the eccentric head oscillates, and a central, spacing lug 47 separates these two seats.

Thus, in Figure 3, assuming that the carrier arm is swung upwardly on its pivots 24, 24', and then to the left, the pin 41 of the arm rides down the liner of slot 42 of the head, and as the carrier arm approaches an upright position the eccentric head is oscillated slightly to the left in Figs. 3 and 6, but as the arm reaches the upright position, pin 41 rides down out of slot 42, contacts with lug 47 and thereby swings the eccentric head over to the right from the position of Figs. 3 and 6. Then as the arm swings down from upright position to the left, the pin 41 rides up into the slot 43, swinging the eccentric head into upright position of Figures 3 and 6, and the arm, now projecting horizontally to the left in Figures 1, 2, is held in that position. By gravity, or the weight of the outwardly projecting, arm, the furrow opener is held in operative position, and it can float, or ride up and down with the pivoted arm, as the furrow opener encounters irregularities in the ground.

To hold the arm in upright position, as when not in use, the pin 41 may be dropped into one of the seats 45 or 46, as the arm is swung upwardly from the right side, or from the left side of the implement.

In order that the furrow opener shall reach the other side of the implement in position for use, as the arm is swung upwardly and over to the left in Figures 2, 3, and 6, an auxiliary movement is imparted to the furrow opener through the movement of the eccentric head, the eccentric rod, and the crank 18 of the furrow opener, which brings the furrow opener to the left side of the implement and standing in upright or perpendicular position.

The first or initial swing of the eccentric head to the left, through pin 39 of the head pulls the eccentric rod to the left and the far or outer wall of the slotted head 29—30 swings the crank clockwise, through the slot to dislodge the crank from its dead-center. Then the swing of the eccentric head to the right, through the movement to the right of the pin 39 in slotted head 34—35, pulls the eccentric rod to the left, and this pull of the rod continues the turn of the crank 18 through an arc of ninety degrees, bringing the crank in the notch 31 as the arm and the furrow opener, together, reach the upright or perpendicular position, as indicated in Figure 4. As the carrier arm swings down to the left, the furrow opener, by gravity, remains in perpendicular position, the crank 18 rides from notch 31 into what becomes the lower end of the slotted head 29—30, i. e. the upper end of the slot as in Fig. 3, and the furrow opener is in position for use.

When the furrow opener and the carrier arm are shifted from the left side of the implement to the right side of the implement, the above functions are performed in reverse order.

In Figure 7 a modified form of furrow opener is indicated at 48, which may be substituted for the double disks 6—7 when desired or necessary.

Having thus fully described my invention, what I claim as new and desire to secure by Letters Patent is:—

1. In a reversible marking device, the combination with a pivoted carrier-arm, an adjustable sleeve thereon, a head rigid with the sleeve, a crank journaled in the head, and a furrow opener rigidly supported on the crank, of an eccentric rod mounted to reciprocate in the arm, an adjustable sleeve mounted on the rod, a slotted head having an intermediate notch and rigid with the latter sleeve, said head being operatively mounted on the crank, and means operable under swinging movement of the arm for longitudinally reciprocating the rod.

2. In a reversible marking device, the combination with a base-support and a carrier-arm pivoted thereon, a marker pivotally suspended on the arm, and a rod mounted in the arm for operating the marker, of an eccentric head pivotally mounted on the support, a pin on the head alined with the pivot of the arm and a slotted connection between said pin and the rod, and means on the arm operable under swinging movement thereof for oscillating the head.

3. The combination with an implement as described, of a pivoted reversible carrier arm, a furrow-opener having a crank-suspension on the arm, an eccentric rod mounted in the arm and having at one end a slotted connection to the crank-suspension, an oscillatable eccentric having a pivotal support and a pin-and-slot connection between the eccentric and the other end of the rod, and means mounted on the arm coacting with the eccentric for actuating the rod with the swinging movement of the arm.

4. In a marking device adapted to be swung manually, the combination with a pivoted, reversible, longitudinally adjustable carrier arm forming a housing, and a reversible marker pivoted at the free end of the carrier arm, of longitudinally adjustable operating means mounted within the housing and longitudinally movable therein for imparting a swinging movement to the marker, oscillatable means mounted at the pivotal point of the carrier arm and operable under swinging movement of the arm to actuate the operating means, and said actuating means also including means for maintaining the marker in operative position.

CONRAD A. RITCHIE.